United States Patent
Scofield et al.

(10) Patent No.: US 9,437,107 B2
(45) Date of Patent: Sep. 6, 2016

(54) EVENT-BASED TRAFFIC ROUTING

(71) Applicant: INRIX, Inc., Kirkland, WA (US)

(72) Inventors: Christopher L. Scofield, Seattle, WA (US); Mark Daymond, Fall City, WA (US)

(73) Assignee: Inrix, Inc., Kirkland, OH (US)

( * ) Notice: Subject to any disclaimer, the term of this patent is extended or adjusted under 35 U.S.C. 154(b) by 0 days.

(21) Appl. No.: 13/838,685

(22) Filed: Mar. 15, 2013

(65) Prior Publication Data

US 2014/0278031 A1    Sep. 18, 2014

(51) Int. Cl.

| | |
|---|---|
| G06F 19/00 | (2011.01) |
| G06G 7/70 | (2006.01) |
| G06G 7/76 | (2006.01) |
| G08G 1/00 | (2006.01) |
| G01C 21/34 | (2006.01) |
| G08G 1/0967 | (2006.01) |
| G08G 1/0968 | (2006.01) |
| G08G 1/01 | (2006.01) |

(52) U.S. Cl.
CPC ............ *G08G 1/00* (2013.01); *G01C 21/3461* (2013.01); *G01C 21/3492* (2013.01); *G08G 1/096741* (2013.01); *G08G 1/096775* (2013.01); *G08G 1/096844* (2013.01); *G08G 1/096888* (2013.01); *G08G 1/0129* (2013.01); *G08G 1/0133* (2013.01)

(58) Field of Classification Search
CPC .......... G01C 21/3492; G01C 21/3407; G01C 21/3415; G01C 21/3461; G01C 21/3679; G01C 21/3682; G01C 21/3685; G01C 21/005
USPC ......... 701/117–119, 439, 442, 465–466, 516
See application file for complete search history.

(56) References Cited

U.S. PATENT DOCUMENTS

| | | | | |
|---|---|---|---|---|
| 6,289,277 | B1 * | 9/2001 | Feyereisen et al. | 701/528 |
| 6,317,686 | B1 * | 11/2001 | Ran | 701/533 |
| 7,027,915 | B2 * | 4/2006 | Craine | G08G 1/096716 |
| | | | | 340/907 |

(Continued)

FOREIGN PATENT DOCUMENTS

| | | |
|---|---|---|
| EP | 1657693 A2 | 5/2006 |
| EP | 1890274 A1 | 2/2008 |
| WO | 99/48073 A1 | 9/1999 |

OTHER PUBLICATIONS http://uagameday.com/football/traffic-flow.php University of Alabama Game Day Traffic Flow Website First published on Jul. 7, 2007 per Way Back Machine (oldest version PDF attached) http://web.archive.org/web/20070707024605/http://uagameday.com/football/traffic-flow.php.*

(Continued)

*Primary Examiner* — Jerrah Edwards
*Assistant Examiner* — Tommy Worden
(74) *Attorney, Agent, or Firm* — Cooper Legal Group, LLC

(57) ABSTRACT

One or more techniques and/or systems are provided for to creating an avoidance zone spatially proximate a venue, where the avoidance zone is created based upon identifying road segments where increased traffic congestion is expected due to an event at the venue. Information pertaining to the avoidance zone, such as a description of road segments to avoid and/or expected travel delays, may be provided to a route planner configured to develop vehicle routes. In this way, the route planner can take into consideration the impact of events on one or more road segments when planning a route.

20 Claims, 6 Drawing Sheets

(56) References Cited

U.S. PATENT DOCUMENTS

| | | | |
|---|---|---|---|
| 7,831,384 B2* | 11/2010 | Bill | 701/423 |
| 7,835,859 B2* | 11/2010 | Bill | 701/424 |
| 7,890,261 B1* | 2/2011 | Harris | G08G 1/0962 |
| | | | 340/988 |
| 8,024,111 B1* | 9/2011 | Meadows et al. | 701/414 |
| 8,108,141 B2* | 1/2012 | Ehrlacher | 701/416 |
| 8,406,998 B2* | 3/2013 | Shaffer et al. | 701/414 |
| 2004/0204845 A1 | 10/2004 | Wong | |
| 2004/0226043 A1* | 11/2004 | Mettu et al. | 725/46 |
| 2006/0058940 A1 | 3/2006 | Kumagai et al. | |
| 2006/0064235 A1* | 3/2006 | Ishikawa et al. | 701/117 |
| 2006/0173841 A1* | 8/2006 | Bill | 707/6 |
| 2007/0010942 A1* | 1/2007 | Bill | 701/209 |
| 2007/0208492 A1 | 9/2007 | Downs et al. | |
| 2008/0094250 A1* | 4/2008 | Myr | 340/909 |
| 2009/0233575 A1* | 9/2009 | Morrison | G08G 1/096725 |
| | | | 455/404.2 |
| 2010/0057346 A1* | 3/2010 | Ehrlacher | 701/202 |
| 2010/0156670 A1* | 6/2010 | Hamilton, II | G07B 15/06 |
| | | | 340/928 |
| 2010/0235210 A1* | 9/2010 | Nadrotowicz, Jr. | 705/8 |
| 2011/0043377 A1 | 2/2011 | McGrath et al. | |
| 2011/0066374 A1* | 3/2011 | Hartman | G01C 21/20 |
| | | | 701/533 |
| 2011/0106436 A1* | 5/2011 | Bill | 701/206 |
| 2013/0051672 A1* | 2/2013 | Robinson et al. | 382/173 |
| 2013/0054746 A1* | 2/2013 | Reimer | 709/217 |
| 2013/0346016 A1* | 12/2013 | Suzuki | G06F 19/3418 |
| | | | 702/141 |
| 2015/0035686 A1* | 2/2015 | Frish | G08G 1/095 |
| | | | 340/907 |
| 2015/0253144 A1* | 9/2015 | Rau | G06Q 10/067 |
| | | | 705/348 |

OTHER PUBLICATIONS

Int. Search Report cited in PCT Application No. PCT/US2014/022525 dated Jul. 18, 2014, 11 pgs.

* cited by examiner

| | 202 | 204 | 206 U.S. Arena 208 | | 212 |
|---|---|---|---|---|---|
| | Event | Event Type | Estimated Attendance | Estimated Vehicle Influx | Parking Map |
| 210 | 3/27/13 7:00 pm ~ 10pm | Prof. Basketball Game | 35,000 | 17,500 | |
| 210 | 3/29/13 1:00 pm ~ 2:30 | Children's Concert | 8,000 | 500 | |
| 210 | 4/1/13 | Country Concert | 25,000 | 12,500 | |

EVENT-BASED TRAFFIC ROUTING

BACKGROUND

Demand on a road segment (e.g., the number of vehicles on the road segment) is often fluid, fluctuating based upon, among other things, the time-of-day, traffic accidents, weather conditions, road construction, road closures, and/or local events (e.g., which may draw a large number of attendees to a venue). As demand approaches and/or exceeds capacity for the road, traffic congestion may be created along the road segment and/or drivers may experience delayed travel times along the road segment.

Route planners (e.g., route navigation software) are frequently configured to identify a temporally shortest route(s) between a starting location and an ending location and/or to estimate the travel time for a route. While route planners frequently attempt to forecast traffic congestion along various road segments and/or forecast expected travel times along respective road segments to accurately identify the temporally shortest route and/or to estimate the travel time for a route, such forecasting is often challenging due to the fluid nature of traffic congestion.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques are described herein for identifying road segments that are likely to be congested (e.g., road segments where drivers are likely to experience slower speeds than typically experienced on the road segment) due to an event at a venue. That is, stated differently, systems and/or techniques are described for forecasting the impact (if any) on one or more road segments due an event, such as a professional football game, a convention, a parade, etc.

Initially, a model is developed to forecast traffic congestion when provided a set of input parameters. The input parameters may include information pertaining to the weather, street construction, street closures, and/or the event itself, such as a time-of-day when the event is to occur, type of event (e.g., a professional football game may attract larger crowds than a high school football game), attendance information, etc. Using this information, the model may forecast traffic congestion (e.g., in terms of expected vehicle speeds, expected vehicle volume, and/or other measures of traffic congestion) for respective road segments during periods of time approaching the event, during the event, and/or after the event, for example. Based upon such forecasting, road segments where traffic congestion is likely to exceed a specified threshold (e.g., roads segments where travel time is expected to increase by at least 5 minutes, road segments where vehicle speeds are likely to drop by at least 20%, etc.) can be identified. An avoidance zone can then be generated using these identified road segments, where the avoidance zone describes a region spatially proximate the venue where the event is likely to have a substantial impact on road segments.

In some embodiments, a route planner configured to plan a route is provided information regarding the avoidance zone to assist in planning the route. In this way, the route planner can take into consideration the impact that the event is likely to have on traffic flow when planning a route (e.g., to plan a route that avoids the avoidance zone and/or to provide an estimated travel time that takes into consideration the expected traffic congestion due to the event). Moreover, information may be presented to the user regarding the event (e.g., concurrently with the presentation of a route) to inform the user about the event and/or to explain to the user why the presented route was selected (e.g., instead of an alternative route that would have caused the user to be routed through the avoidance zone).

The following description and annexed drawings set forth certain illustrative aspects and implementations. These are indicative of but a few of the various ways in which one or more aspects may be employed. Other aspects, advantages, and/or novel features of the disclosure may become apparent from the following detailed description when considered in conjunction with the annexed drawings.

DETAILED DESCRIPTION

Figure 1:
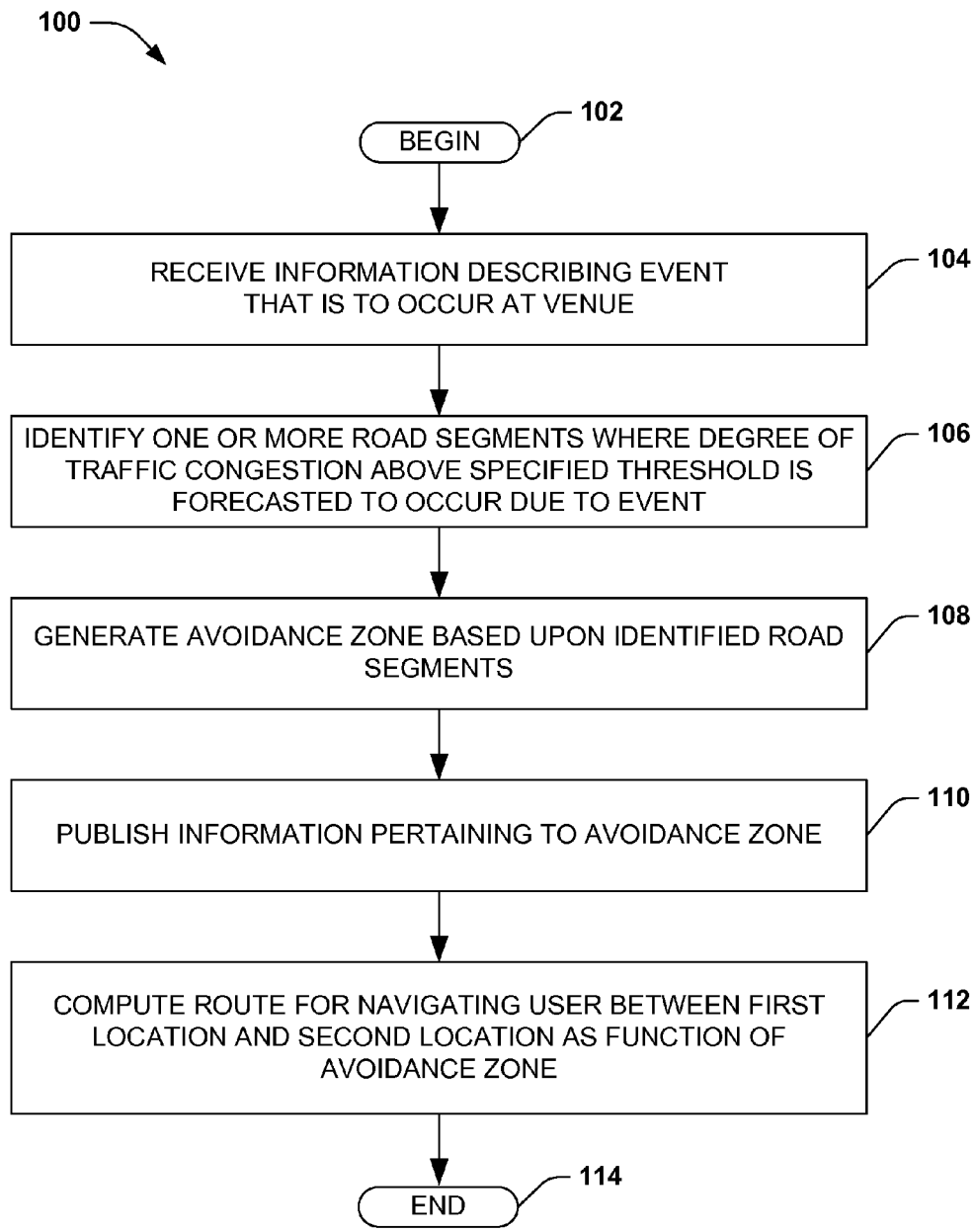
FIG. 1 illustrates a flow diagram of an example method for traffic avoidance.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Demand on road segments is frequently changing due to, among other things, time-of-day, accidents, weather, construction, road closures, etc. Accordingly, estimating the travel time between a starting location and an ending location and/or identifying a temporally shortest route is often challenging, particularly when forecasting travel times for future travel (e.g., where conditions along a road segment at the time of travel may not mirror present conditions, making it difficult to use present travel times as a good indicator of future travel times). In recent years, models for forecasting future travel times have been developed that take into consideration cyclical or routine changes in vehicle volume.

For example, vehicle volume and/or travels times during a rush-hour may be predicted for a road segment based upon data regarding vehicle volume and/or travel times for the road segment during past rush-hours. However, few, if any, models take into consideration the impact that local events, such as concerts, sporting events, conferences, parades, etc. have on road segments.

Accordingly, systems and/or techniques are provided herein for forecasting traffic congestion along one or more road segments due to an event at a venue (e.g., such as a stadium, concert hall, conference center, etc.). Information about one or more events is uploaded into a system, where the information may describe the type of event (e.g., college football game, high school football game, concert, etc.), expected attendance at the event, a starting time of the event, and/or a time window when the event is expected occur, for example. Using such information, a model may forecast traffic congestion on one or more road segments in close spatial proximity to the venue (e.g., where a road segment may be an entire road or merely a portion of a road) during times leading up to the event, during the event, and/or during times following the event. More particularly, the model may estimate vehicle speeds, vehicle volumes, vehicle density, and/or other measures of congestion to evaluate a degree to which congestion is likely to occur. Road segments where the degree of traffic congestion is likely to exceed a specified threshold (e.g., road segments where the estimated vehicle speeds are impacted by at least 20% relative to a reference speed for the road segment) may be identified and utilized to develop an avoidance zone spatially proximate the venue. The avoidance zone typically describes a region where traffic congestion is likely to occur due to an event and/or where traffic congestion is likely to have an impact on travel times.

In some embodiments, a route planner configured to generate a route(s) between a starting location and an ending location is provided with information regarding the avoidance zone, which may be used by the route planner to identify alternate routes that would bypass the avoidance zone and/or to update a travel time in view of the event. In other embodiments, the information regarding the avoidance zone is provided to a client device and presented to the user (e.g., to inform the user why an alternate route is being selected instead of a usual route the user may take between the starting location and the ending location).

Turning to FIG. 1, an example method 100 for traffic avoidance is provided. More particularly, the method 100 describes a technique for forecasting the impact of an upcoming event at a venue and/or for routing a user based upon such a forecast (e.g., where the impact of the event is forecast in terms of a degree to which the event is expected to impact traffic congestion). The method 100 finds particular application to forecasting traffic congestion due to an event that is non-cyclical and/or an event that is cyclical but occurs infrequently (e.g., the cycle time is more than a day or week). For example, the method 100 may find particular application when forecasting traffic congestion due to sporting events, concert events, plays, conferences, and/or other scheduled events that typically draw a sufficient number of people to impact a number of vehicles on one or more road segments spatially proximate to (e.g., surrounding) a venue that is hosting the event, to impact vehicle speeds along the one or more road segments, and/or vehicle density along the one or more road segments, for example.

The example method 100 begins at 102, and information describing an event that is to occur at a venue is received at 104. By way of example, a schedule of events for a venue may be received at 104. The schedule may include information pertaining to when respective events are to occur and/or a type of event that is occurring (e.g., professional basketball game, professional hockey game, concert, etc.). Other examples of information that may be received at 104 include, predicted/estimated attendance at the event, a number of tickets sold for the event, venue capacity for a venue hosting the event, and/or other information from which crowd attendance can be estimated, etc. Still other examples of information that may be received at 104 may relate to estimated vehicle influx for the event. For example, information may be received from parking establishments indicative of parking forecast (e.g., number of vehicles the parking establishment anticipates to intake for the event, a number of reserved parking spaces for the event, etc.).

The information may be received from any one or more of a variety of sources, including data sources associated with the venue (e.g., such as a website for the venue), data sources associated with one or more government agencies (e.g., such as data sources associated with a permit office, a visitors bureau, a local police agency, etc.), and/or data sources associated with other private entities, such as parking establishments and/or ticket agencies from which tickets to the event may be acquired. Moreover, the information received at 104 may be pushed or pulled from respective one or more data sources. By way of example, a crawler may be configured to crawl a list of predefined webpages to scrape information describing one or more events, such as event schedules. As another example, the venue may push information, such as estimated attendance figures, actual ticket sale information, estimated vehicle influx, etc., to a service configured to receive such information.

In still other embodiments, information describing the event may be received from one or more social networking data sources, such as a website hosted by a social networking service, an electronic invitation service, etc. By way of example, users and/or venues may create an event entry on a social networking website that describes the event. The social networking website may be periodically or intermittently scraped to acquire such event entries and/or the social networking website may be configured to push data associated with such event entries to a service configured to receive such data (e.g., information). In some embodiments, the information received from social networking data sources may include an invited guest list, an attendance list, and/or information pertaining to a number of users who "like" the event or otherwise associate with the event. By way of example, an event entry on a social networking website may include a field that respective users can select if the user intends to attend the event. Information pertaining to a number of users who select the field may be provided at 104, and used to predict/estimate a number of attendees. In other embodiments, status messages or other user-inputted information pertaining to the event may be received at 104 from the social networking website or other social networking data sources. By way of example, information pertaining to a number of users of a social networking website whom have mentioned the event in status messages and/or used a hash-tag indicative of the event may be received at 104 from the social networking website. In some embodiments, the received information may be geo-location specific. For example, merely status information and/or hash-tag information from users within a specified spatial proximity of a venue hosting the event may be received at 104 and/or the received information 104 may be filtered based upon a location of the user relative to the venue. In this way, social media information may be harnessed to identify events that are to occur and/or to determine additional information about the event such as a number of users likely to attend the event, a likely demographic for the event, etc.

In some embodiments, based upon information initially received at 104, additional information describing the event may be acquired. By way of example, a schedule of events occurring at a venue may be initially received at 104, and a service receiving the schedule of events may generate a request for additional information regarding an event(s) included in the schedule. Such a request may seek information from a local police agency regarding a number of officers assigned for traffic management during the event and/or may seek information pertaining to one or more permits (e.g., such as street closure permits) from a government agency responsible for processing such permits, for example. In this way, additional information relevant to determining a number of attendees to an event, an expected vehicle influx, and/or expected street congestion/closures, for example, can be acquired.

At 106 in the example method 100, one or more road segments where a degree of traffic congestion above a specified threshold is likely to occur due to the event are identified. Traffic congestion generally may be defined in terms of vehicle speeds, vehicle volume, vehicle densities, and/or other measures of congestion. Accordingly, where reference is made to forecasting a degree of traffic congestion, it is to be appreciated that in practice one or more measures of congestion may be forecasted and compared to a specified threshold(s) for the measure(s) to identify road segments where the degree of traffic congestion is likely to exceed a specified threshold. By way of example, a road segment where the event is expected to reduce vehicle speeds by 20% relative to a reference speed for the road segment may be identified at 106 as likely to experience a degree of congestion above a specified threshold. As another example, a road segment where travel time is expected to increase by at least five minutes relative to a typical travel time may be identified. As yet another example, a road segment where vehicle density is expected to increase by 30% relative to a reference density for the road segment may be identified.

To identify such road segments, the information received at 104 is processed using analytic, iterative, or other processing techniques to forecast the degree of traffic congestion along respective road segments during a time window temporally proximate a time of the event. By way of example, estimated or actual attendance figures may be used to estimate a number of vehicles expected for the event (e.g., where a ratio, such as 2:1, may be devised for estimating the number of vehicles driven to the event based upon the attendance figures) and/or to forecast how those vehicles are expected to impact respective road segments (e.g., a degree of traffic congestion respective road segments are expected to experience). As still another example, the location(s) of parking establishments spatially proximate the venue may be received at 104 and used to forecast the degree of traffic congestion along respective road segments. By way of example, it may be forecasted from attendance figures that approximately 5,000 vehicles are to be driven to the event. Moreover, based upon the location of the parking garages spatially proximate the venue, it may be forecasted that approximately 4,000 of those vehicles will park on a west side of the venue and the remaining 1,000 will park on the north side. Accordingly, it may be forecasted that road segments on the northwest side of the venue may experience a higher degree of traffic congestion relative to the a degree of traffic congestion experienced along road segments on the south side or east side of the venue (e.g., particularly if major thoroughfares, such as highway on-ramps are also located on the northwest side and thus vehicles do not have to travel from the south side or east side to reach the parking establishments).

In some embodiments a model may be devised for forecasting the degree of traffic congestion. By way of example, and as will be described further with respect to FIG. 4, a machine learning algorithm such as an artificial neural network, Bayesian network, etc., may be configured to develop a model to estimate the degree of traffic congestion based upon historical traffic data and historical information regarding past events at one or more venues (e.g., such as an event schedule). Subsequently, information received at 104 may be input into the model to forecast the degree of congestion for one or more road segments. By way of example, the information may describe a time of the event (e.g., whether the event falls on a weekday or a weekend, whether the event is in the morning or evening, etc.), a type of event to which an event corresponds (e.g., whether the event is a professional sporting event, high school sporting event, nationally recognized conference, etc.), attendance information, weather forecasts, etc. The model may compare such information to historical information regarding past events (e.g., at the same venue or at other venues) and/or the historical traffic data corresponding to such past events to forecast a degree of congestion along one or more road segments. For example, the model may identify one or more past events that most closely resemble the event and may review traffic data during the one or more past events to forecast traffic congestion along one or more road segments spatially proximate the venue for a time window proximate the time of the event.

In some embodiments, the type of event (e.g., sporting event, concert, public conference, etc.) to which an event corresponds may have a substantial impact the degree to which traffic congestion occurs on one or more road segments, and thus the model may also take into consideration the type of event. By way of example, some conferences may be an all-day event, where participates are expected to arrive in the morning and stay until the evening. Other conferences, such as a home show or a boat show, may encourage attendees to freely come-and-go. Accordingly, some conferences may have a prolonged impact on traffic congestion while others merely impact traffic congestion for a short period of time (e.g., such as merely at the beginning or end of the conference and not during the duration of the conference). Moreover, events where attendees arrive and/or leave in mass may have a different (e.g., greater) impact on traffic congestion than events where attendees arrive and/or leave more gradually.

In still other embodiments, the model takes into consideration still other types of information. By way of example, weather conditions proximate a time of the event may impact road segment capacity and/or may impact the number attendees to an event and/or local news media coverage of an event may impact the number of attendees to an event. Accordingly, such information may also be retrieved and considered by the model when attempting to determine a degree of traffic congestion along road segments spatially proximate the venue hosting the event.

At 108 in the example method 100, an avoidance zone is generated based upon the road segments identified at 106 where the degree of congestion is likely to exceed specified criteria. The avoidance zone describes a region spatially proximate the event where the event is likely to have a substantial impact on vehicle movement (e.g., where vehicle speeds are expected to be 20% less than a reference speed for a road segment, vehicle density is expected to increase relative to a reference density for the road segment, etc.). Typically, the avoidance zone further describes a region that users are suggested to avoid during a time window temporally proximate a time of the event.

In some embodiments, the avoidance zone is created by identifying points along respective road segments where the degree of traffic congestion is expected to transition from above the specified threshold to below the specified threshold (e.g., such as transitions from heavy volume to moderate or lite volume) or vice versa. By way of example, in some embodiments, the degree of traffic congestion may be defined in terms of vehicle density (e.g., the greater the density, the higher the degree of traffic congestion). Accordingly, for a first road segment, a first point where the vehicle density is expected to transition between a first density below a first specified threshold (e.g., a lite or moderate density for the first road segment) and a second density above the first specified threshold (e.g., a heavy density for the first road segment) may be identified. Similarly, for a second road segment, a second point where vehicle density is likely to transition between a third density below a second specified threshold (e.g., a lite or moderate volume for the second road segment) and a fourth density above the second specified threshold (e.g., a heavy volume for the second road segment) may be identified. Such points (e.g., along with similar points of other road segments) may be subsequently used to define a parameter of the avoidance zone.

In other embodiments, other techniques for generating an avoidance zone based upon the identified road segments are contemplated. For example, the avoidance zone may comprise one or more subzones that further define how traffic congestion is expected to be impacted due to the event. For example, a first subzone may comprise road segments where vehicle density is expected to be moderate due to the event (e.g., and thus the event is likely to have at least some impact on travel times) and a second subzone may describe road segments where vehicle density is expected to be heavier due to the event (e.g., and thus the event is likely to have a more substantial impact on travel times). As another example, the avoidance zone may be centered at the venue and may extend in a circular fashion to a diameter that causes the avoidance zone to include the road segment furthest away from the venue where the degree of traffic congestion is expected to be above a the specified threshold.

In some embodiment, the avoidance zone may be adjusted during various portions of the event. For example, during the hour leading up to a start of a baseball game, roads surrounding a stadium may be inundated with vehicles as attendees arrive at the stadium causing a high degree of traffic congestion. The degree of congestion may substantially decrease during the game and may ramp up again near the end of the game. Accordingly, the avoidance zone may be substantially larger in area before and after the game and may decrease in area (e.g., or may disappear) during the game, for example. As another example, the degree of traffic congestion may be revised as the event approaches and/or during the event, causing the avoidance zone to be altered in size/area. For example, as the event approaches, attendance estimates may be revised and/or real-time traffic data in the hour leading up to the game may indicate that fewer people (e.g., and fewer vehicles) are expected at the event than initially estimated. Accordingly, the avoidance zone may be revised in size based upon the revised attendance estimates and/or real-time traffic data. In this way, the size and/or scope of the avoidance zone (e.g., which road segments are encompassed within the avoidance zone) may be adjusted dynamically as additional information is received that facilitates refinement of the initial forecast regarding traffic congestion, for example.

The avoidance zone describes a region where the event is likely to have an impact or a substantial impact on traffic congestion, and information pertaining to the avoidance zone is published at 110. Such information may include the geographic location(s) of the avoidance zone, information describing the event and/or venue (e.g., such as the type of event, start time of the event, expected end time of the event, etc.), and/or estimate travel times one or more along road segments included in the avoidance zone. The avoidance zone may be published at regular intervals and/or on demand (e.g., such as upon receipt of a request to plan a route), for example. Moreover, the avoidance zone may be published merely within a system of servers (e.g., so that devices and/or users external to the system cannot view such information), may be published to client devices, and/or may be published on publically accessible servers (e.g., such as viewable via an Internet website, for example).

At 112 in the example method 100, a route is computed for navigating a user between a first location (e.g., starting location) and a second location (e.g., ending location or destination) as a function of the avoidance zone. By way of example, a user may desire to travel across the city to visit a fresh produce market and request directions to the market from his/her current location. Typically, such a route may cause the user to travel on one or more road segments included within the avoidance zone. However, based upon the published information, the route planner may identify an alternate route that avoids the one or more road segments included within the avoidance zone and/or may provide an estimated travel time that factors in the increased traffic congestion along the one or more road segments due to the event and included within the avoidance zone.

It may be appreciated that in some embodiments, an avoidance zone may not be established when a route is initially planned and the route planner may be configured to update the route periodically and/or intermittently based upon newly generated/published avoidance zones. By way of example, a user may request that the route planner devise a route from Washington D.C. to Florida. The route planner may devise an initial route (e.g., a temporally shortest route) and may verify that no portions of the initial route are encompassed within an avoidance zone. However, while the user is in transit and prior to the user passing through Atlanta, an avoidance zone may be generated near Atlanta that includes a segment of a highway listed in the initial route. When the route planner receives information about the newly generated avoidance zone, the route planner may compute an updated travel time if the initial route is maintained and/or update the route in view of an alternate route that will decrease travel time, for example.

At 114, the example method 100 ends.

Figures 2, 3:
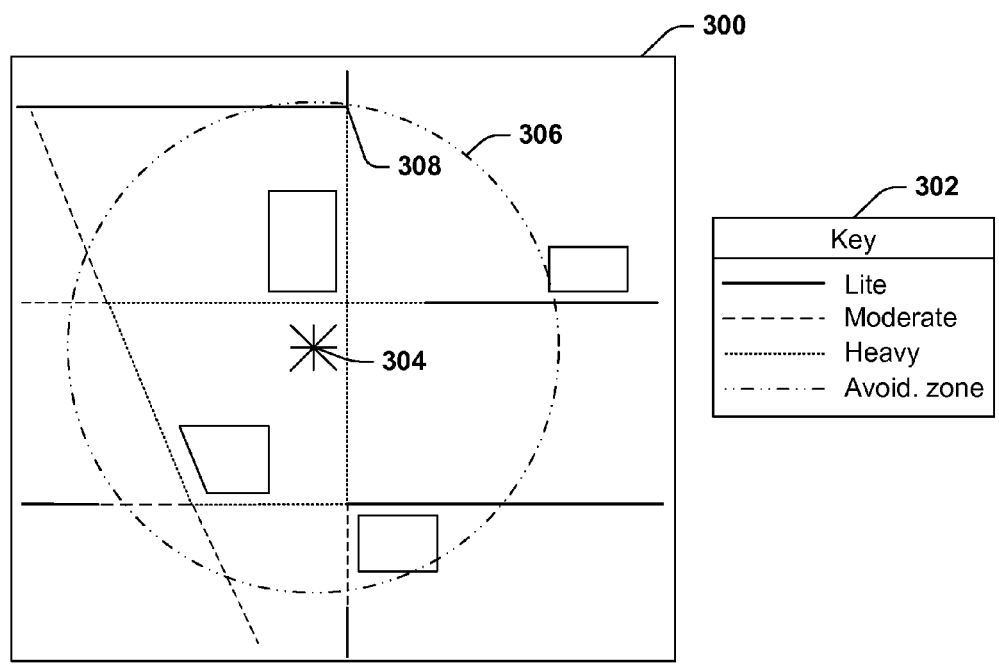
FIG. 2 illustrates an example table comprising information pertaining to an event that may be utilized to estimate vehicle volume along one or more road segments.
FIG. 3 illustrates a map describing estimated vehicle congestion along one or more road segments spatially proximate to a venue and an avoidance zone generated in view of the estimated vehicle congestion.

FIG. 2 illustrates an example table 200 depicting information that may be received (e.g., at 104 in FIG. 1) from one or more data sources pertaining to events hosted at a venue (e.g., U.S. Arena) and/or information that may be derived from such information. It is to be appreciated that the information provided in the table 200 is merely intended to represent example types of information that can be received and/or derived from the received information, and is not intended to be an exhaustive list of possible types of information, and may contain information not used in other embodiments. Moreover, it is to be appreciated that while the example table 200 lists merely events occurring at a single venue, information may be received at 104 pertaining to events hosted at numerous different venues.

The table 200 includes an event column 202, an event type column 204, an estimated attendance column 206, and an estimated vehicle influx column 208. Respective rows 210 are indicative of a single event. The table also includes a parking map 212, which illustrates the location of the venue (e.g., represented at the asterisk) relative to one or more parking garages (e.g., represented by the squares) and surrounding road segments.

The event column 202 lists a scheduled time of respective events (e.g., date, starting time, and approximate duration), and the event type column 204 lists the type of event to occur. The estimated attendance column 206 lists the estimated attendance for the event, and the estimated vehicle influx column 208 lists how many additional vehicles are expected to be in an area proximate the venue due to the event. In some embodiments, the estimated vehicle influx may be provided to a service configured to receive information pertaining to the event, such as by a government agency responsible for managing traffic and/or by a parking establishment. In other embodiments, the estimated vehicle influx may be derived based upon, among other things, estimated attendance and/or historical traffic data regarding other similar events at the venue. For example, based upon historical traffic data, it may be determined that there is approximately a 2:1 ratio between attendance and vehicle volume for a professional basketball game at a stadium. As another example, the ratio between attendees and vehicles at a children's concert during a week day may be much lower ratio (e.g., 16:1) because children often commute to such concerts via school buses.

The parking map 212 may be used to estimate which road segments attendees are likely to travel to arrive at the venue or rather to arrive at a parking establishment. For example, a first parking establishment spatially nearest the venue may have a vehicle capacity of 5,000 vehicles and a second parking establishment, which is the next spatially nearest parking establishment, may have a vehicle capacity of 7,500 vehicles. Accordingly, during the country concert, it may be predicted that road segments spatially proximate the first and second parking establishments may be substantially impacted by the concert while road segments proximate other parking establishments may not be impacted (e.g., because the first and second parking establishments can accommodate all of the vehicles and are closer to the venue). As another example, the cost of parking at various parking establishments may be utilized to determine where users are likely to park and thus the impact the event is likely to have on respective road segments.

FIG. 3 illustrates an example map 300 describing forecasted traffic congestion along road segments spatially proximate a venue 304 during an event (e.g., which may be forecasted based upon expected vehicle speeds during the event, expected vehicle density during the event, etc.). The forecasted traffic congestion along respective road segments is represented by various line patterns. For example, as detailed in the key 302, road segments depicted as a solid line are expected to experience little to no traffic congestion during a time window temporally proximate a time of the event (e.g., the forecasted vehicle speed during the event is expected to substantially match a reference speed). Road segments depicted as a dashed line are expected to experience moderate traffic congestion during a time window temporally proximate a time of the event (e.g., the forecasted vehicle speed during the event is expected to be slightly less than the reference speed). Road segments depicted as a dotted line are expected to experience heavy traffic congestion during a time window temporally proximate a time of the event (e.g., the forecasted vehicle speed during the event is expected to be substantially less than the reference speed).

The avoidance zone 306 (e.g., represented by the dash-dot-dot line) describes a region spatially proximate a venue that may be impacted due to the event (e.g., and thus users may want to avoid due to the impact of the event on travel times). In the illustrated embodiment, the avoidance zone 306 is centered at the venue and extends radially to include road segments where heavy traffic congestion is expected during the time window temporally proximate the time of the event. For example, in the illustrated embodiment, the point furthest away from the venue where heavy traffic congestion is expected is the point indicated by reference character 308. Accordingly, the circumference of the avoidance zone 306 intersects the point 308, and an area encompassed within the circumference includes road segments where heavy traffic congestion is forecasted and other road segments that are located closer to the venue 304 than the point 308 (e.g., which may include road segments where traffic congestion is not expected to be heavy and/or where insufficient historical information exists from which to forecast traffic congestion).

It is to be appreciated that while the illustrated embodiment depicts a circular avoidance zone, in other embodiments, the avoidance zone may be non-circular. By way of example, in some embodiments, the avoidance zone is defined to merely include road segments where traffic congestion above a specified degree is expected during the time window temporally proximate the time of the event. Accordingly, the shape of the avoidance zone may be a function of where such road segments are located. Moreover, in still other embodiments, a plurality of avoidance zones may be associated with an event. For example, a first avoidance zone may be generated that encompasses road segments where vehicle speed is expected be substantially impacted (e.g., vehicle speed is expected to drop by 20% relative to a reference speed for the road segment) and a second avoidance zone may be generated that encompasses road segments where vehicle speed is expected to be less impacted (e.g., vehicle speed is expected to drop between 10% and 20% relative to the reference speed). Further, although the example avoidance zone 306 is centered at the venue 304, in some embodiments, the avoidance zone 306 may not be centered at the venue 304 and/or may not include the venue 304. By way of example, parking establishments may be predominately located spatially proximate a northwest corner of the venue 304. Accordingly, the avoidance zone 306 may be defined as a region that includes such parking establishments and may or may not include the venue 304 itself.

Figure 4:
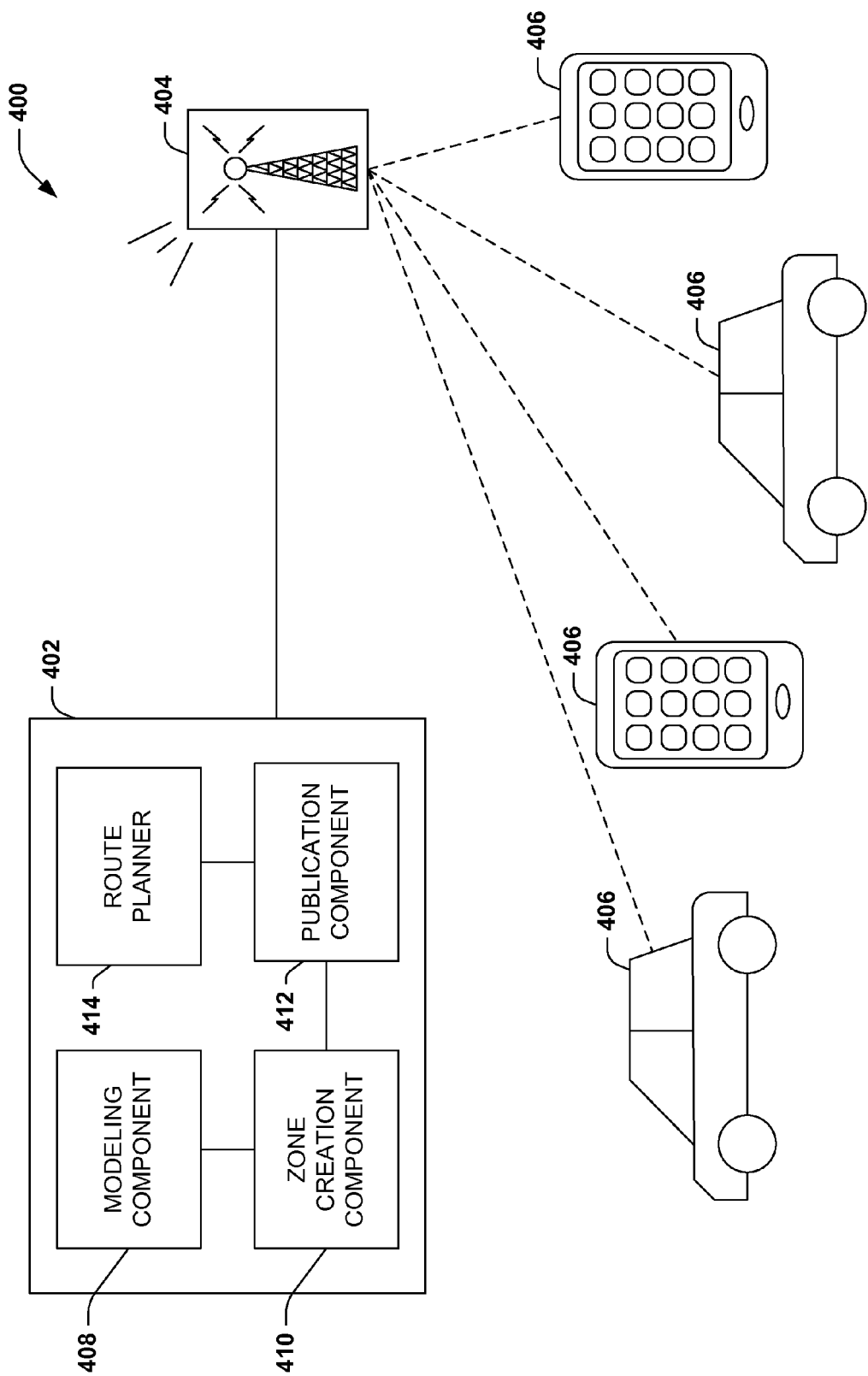
FIG. 4 illustrates an example system for routing a vehicle in view of an event occurring at a venue.

FIG. 4 illustrates an example environment 400 for route navigation. More particularly, the example environment 400 illustrates a component block diagram of a system 402 for routing vehicles, which is operably coupled to a communication device 404 that facilitates communication between the system 402 and client devices 406. Such client devices 406 may include dedicated GPS systems, cellular telephones, tablets, laptops, in-head vehicle units (e.g., display systems mounted inside a vehicle), eyewear and/or other wearable intelligent devices (e.g., watches, jewelry, etc.), vehicle dashboard or windshield displays, etc. configured to provide route information visually, tactually, and/or aurally, for example.

The example system 402 comprises a modeling component 408, a zone creation component 410, a publication component 412, and a route planner 414, although one or more of the foregoing components may be part of a client device 406. For example, the route planner 414 may be part of a client device 406 and may receive information regarding avoidance zones and/or other routing information (e.g., such as present traffic conditions) via the system 402.

The modeling component 408 is configured to develop a model for identifying one or more road segments where the degree of traffic congestion due to an event at a venue is likely to exceed a specified threshold. That is, stated differently, the modeling component 408 is configured to forecast traffic congestion due to an event using analytic, iterative, or other forecasting techniques. In some embodiments, the modeling component 408 may develop a forecasting model using one or more machine learning techniques such as a Bayesian networks, artificial neural network, clustering, etc., which evaluate historical information (e.g., a history of events at a venue and/or a history of traffic patterns for one or more road segments) to develop a model describing a likely outcome given a set of one or more inputs. By way of example, an event schedule describing past events may be compared to historical traffic data to evaluate how respective events impacted traffic congestion along one or more road segments and to develop a correlative relationship between various events and their impact on traffic congestion. In this way, a model can be developed that forecast traffic congestion (e.g., or a measure of traffic congestion such as vehicle speed, vehicle volume, vehicle density, etc.) along one or more road segments for a given future event. Moreover, in some embodiments, the modeling component 408 is configured to further refine or update the model based upon differences between forecasted traffic congestion for an event and actual traffic data corresponding to the event (e.g., so that the model is continually refined as additional data is acquired).

To develop a forecast of traffic congestion for one or more road segments proximate a venue where an event is to be held, the modeling component 408 is configured to receive information about the event, such as information pertaining to when the event is to occur, a type of event to occur, venue capacity at the venue hosting the event, estimated attendance, ticket sales, reserved parking, relative location of the venue to nearby parking establishments, number of parking spaces available at nearby parking establishments, weather forecast for the event, media coverage of the event, number and/or cost of advertisements targeting the event, etc. Typically, the greater the amount of information available to the model, the more accurate the estimate. Accordingly, in some embodiments, the modeling component 408 is further configured to evaluate the received information to determine whether to request additional information. By way of example, the modeling component 408 may initially merely receive an event schedule and determine that based merely upon the event schedule, that number of vehicles expected for an event may range from 5,000-15,000 (e.g., making it difficult to forecast which road segments might be congested). Accordingly, the modeling component 408 may request additional information. For example, the modeling component 408 may request information pertaining to estimated attendance, pertaining to media coverage (e.g., a sporting event between rival teams may increase attendance and be more widely covered in the news media than a sporting event between two teams that are not rivals), etc.

The zone creation component 410 is configured to generate an avoidance zone spatially proximate the venue where an event is held. The avoidance zone typically describes one or more road segments that are likely to be impacted due to the traffic congestion and thus users may desire to avoid during a time window temporally proximate to a time of the event. Stated differently, the avoidance zone describes road segments that are likely to be congested due to an event and, in some embodiments, further describes estimated travel times along one or more road segments within the avoidance zone before, during, and/or after the event.

The zone creation component 410 is typically configured to generate or develop the avoidance zone based upon forecasted information provided by the modeling component 408. By way of example, the zone creation component 410 may be configured to generate the avoidance zone based upon the one or more road segments identified, by the modeling component 408, as likely to experience a degree of traffic congestion due the event that exceeds a specified threshold.

In some embodiments, the avoidance zone may merely comprise those road segments where the degree of traffic congestion is expected to be above the specified threshold. In other embodiments, the avoidance zone may further comprise road segments where the degree of traffic congestion is expected to be less than the specified threshold and/or road segments where insufficient traffic data is available from which to forecast traffic congestion. By way of example, traffic sensors may not measure vehicle counts on alleyways or side-streets that connect two or more higher capacity road segments. Accordingly, there may be little to no historical traffic data from which to forecast traffic congestion along such alleyways or side-streets. However, due to the spatial proximity of one or more alleyways or side-streets to a road segment where the degree of traffic congestion is forecasted to be above a specified threshold, the zone creation component 410 may develop the avoidance zone in a manner that includes such side-streets or alleyways, for example (e.g., because it is likely such alleyways or side-streets will also be congested if a nearby road segment is likely to be congested).

Moreover, it may be appreciated that in some embodiments, the zone creation component 410 may be configured to further update the avoidance zone based upon changes in one or more inputs to the model (e.g., a change to one or more conditions associated with the event). By way of example, additional tickets sales in the hours before an event may cause the modeling component 408 to update forecasted traffic congestion for one or more road segments, which in turn may cause the zone creation component 410 to update the avoidance zone. As another example, traffic data acquired in the hour leading up to the event may indicate that the influx of vehicles for the event was less than expected. Accordingly, the modeling component 408 may downwardly adjust traffic congestion forecast for after the event and the zone creation component 410 may update the avoidance zone accordingly.

The publication component 412 is configured to publish information pertaining to the avoidance zone. For example, the publication component 412 may publish Global Positioning Satellite (GPS) coordinates or other locational coordinates describing a parameter of the avoidance zone and/or may publish a list of road segments included within the avoidance zone. In others embodiments, the publication component 412 may publish information describing an estimated time window when the avoidance zone is in effect and/or estimated travel times for one or more road segments included within the avoidance zone. In still other embodiments, the publication component 412 may publish information about an event to which the avoidance zone pertains.

By way of example, the publication component 412 may publish a description of the event and/or other information which informs the user about the event and/or the reason for the avoidance zone.

Typically, the publication component 412 is configured to publish the information pertaining to the avoidance zone to the route planner 414, which is configured to generate one or more routes for navigating a user from a starting location to an ending location. Accordingly, where the route planner 414 is part of the system 400, such a publication may occur internally within a network of one or more computer systems, for example (e.g., providing the information to a server running a routing application configured to compute one or more preferred routes). In other embodiments, the route planner 414 may be part of a client device 406. Accordingly, the publication component 412 may be configured to publish information pertaining to the avoidance zone to one or more client devices 406 via the communication device 404, for example. In still other embodiments, the publication component 412 may publish the information pertaining to the avoidance zone to one or more client devices 406 regardless of the location of the route planner 414. By way of example, the publication component 412 may publish a message, such as via an in-application messaging system, SMS messaging, etc. describing the avoidance zone. As an example, the publication component 412 may publish a message notifying one or more client devices that higher than normal traffic congestion is expected in a vicinity of a venue due to an event at the venue, for example.

The route planner 414 of the example system 400 is configured to receive a desired starting location and a desired ending location and to generate one or more routes for navigating a user between the starting location and the ending location. Where multiple routes are available between the starting location and the ending location, the route planner 414 may be further configured to identify one or more preferred routes using analytic, iterative, or other routing techniques. A preferred route typically is a route that more closely satisfies one or more specified criteria than other available routes. For example, in some embodiments, the route planner 414 may be configured to identify a temporally shortest route or a spatially shortest route. In other embodiments, the route planner 414 may be configured to identify the three temporally shortest routes as preferred routes and/or may be configured to identify two preferred routes, a first preferred route being the temporally shortest route and a second preferred route being the spatially shortest route.

The route planner 414 is configured to give consideration to information regarding avoidance zones that has been published by the publication component 412 when determining a preferred route and/or when estimating a travel time and/or an arrival time at the destination. By way of example, when an event is not occurring at a venue or low-attendance event is occurring at the venue, the preferred route (e.g., the temporally shortest route) may be a route that causes the user to travel a road segment adjacent the venue. However, when the information regarding an avoidance zone indicates that substantial traffic congestion is expected near the venue, the preferred route (e.g., the temporally shortest route) may be a route that bypasses one or more road segments neighboring the venue.

Where the route planner 414 is located within the system 400 and not part of a client device 406, the route planner 414 may be further configured to transmit one or more preferred routes to a client device 406 requesting such information. In this way, a client device receives data for routing the user between the starting location and the ending location, for example.

Figure 5:
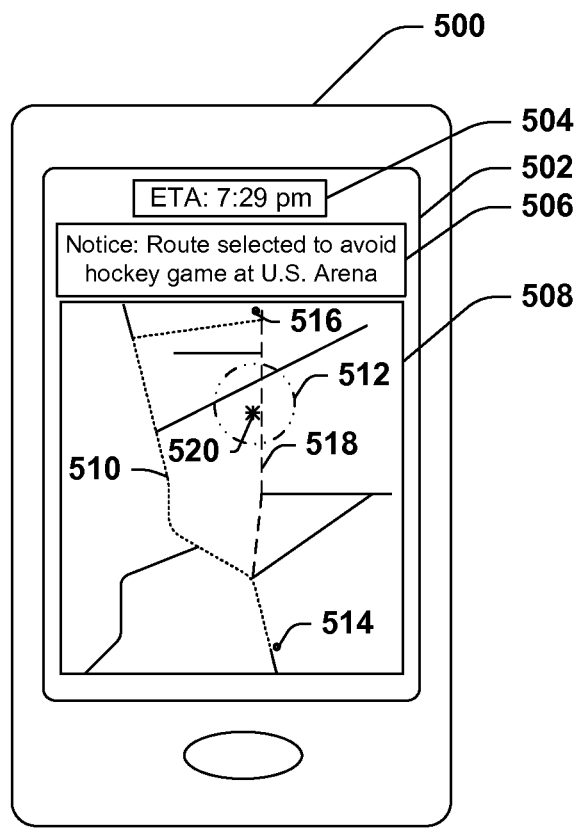
FIG. 5 illustrates a client device on which a graphical user interface for displaying route information and information pertaining to an avoidance zone can be presented.

FIG. 5 illustrates an example client device 500, which may be configured to visually, tactually, or aurally provide the user with route information and/or information regarding the avoidance zone along with information describing why a route was selected as the preferred route. The client device 500 may be configured to execute a navigation application which includes a graphical user interface 502 configured to facilitate graphically presenting a route (e.g., navigation data generated by a route planner) to a user. The graphical user interface 502 comprises an ETA field 504 for presenting an estimated time of arrival, an event field 506 for presenting information pertaining to an avoidance zone that affected the selection of the preferred route and/or affected the estimated travel time (e.g., presenting information describing why the preferred route was selected instead of a different route), and a mapping field 508 for presenting, among other things, a preferred route 510 (e.g., represented by the dotted line).

In some embodiments, when an avoidance zone affects the selection of a preferred route (e.g., when a different route would have been selected if an event was not taking place at the venue) and/or impacts the estimated travel time of the preferred route, the graphical user interface 502 may be further configured to present the avoidance zone 512 within the mapping field 508 and/or to display within the event field 506 a notice explaining why the preferred route 510 was selected. In this way, the user is made aware of the event to reduce the probability that the user will override the route planner and take a different route that intersects the avoidance zone 512 (e.g., because under normal circumstances the different route may be faster).

By way of example, the temporally shortest route between the starting location 514 and the ending location 516 may typically be a route 518 that includes a road segment adjacent a venue 520 (e.g., where the route 518 is shown by the dashed line), and thus such a route 518 may be typically presented as the preferred route. However, due to a hockey game set to begin in an hour and a half, it is expected that congestion along the road segment adjacent a venue 520 for the hockey game will increase substantially by the time the user is traveling the road segment adjacent the venue 520, leading to a delayed commute for the user. Accordingly, the route planner may determine that the temporally shortest route in this instance (e.g., the preferred route 510) is a route that normally would result in a longer commute than the route 518. As such, the graphical user interface may be configured to display, within the event field 506, a notice explaining why a route that typically has a longer travel time was selected as the preferred route and/or may be configured to display the avoidance zone 512 within the mapping field 508, for example.

In some embodiments, the navigation program and/or graphical user interface may include additional features not depicted herein. For example, in some embodiments, portions of the graphical user interface 502 are selectable by a user to alter the interface and/or display additional features. By way of example, the graphical user interface 502 may present the user with an option to select the event field 506 to obtain additional information about the event and/or to purchase tickets for the event.

Figure 6:
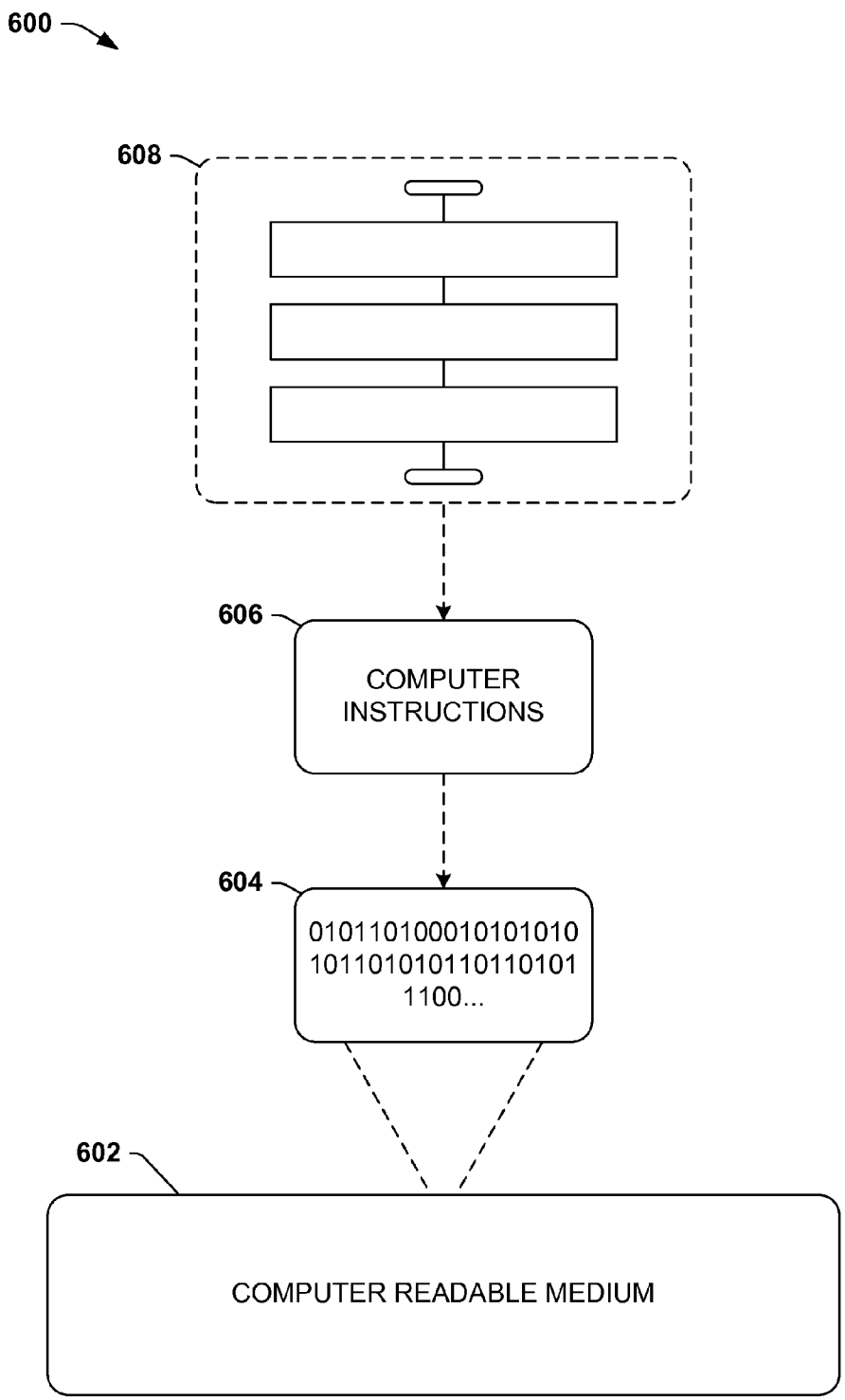
FIG. 6 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, a platter of a hard disk drives, flash drive, application-specific integrated circuit (ASIC), field-programmable gate array (FPGA), etc.), on which is encoded computer-readable data 604. This computer-readable data 604 in turn comprises a set of processor-executable instructions 606 which when executed via a processing unit(s) is configured to operate according to one or more of the principles set forth herein. In some such embodiments 600, the processor-executable computer instructions 606 may be configured to perform a method 608, such as at least some of the exemplary method 100 of FIG. 1, for example. In other such embodiments, the processor-executable instructions 606 may be configured to implement a system, such as at least some of the exemplary environment 400 of FIG. 4, for example. Many such computer-readable media 602 may be devised by those of ordinary skill in the art that are configured to operate in accordance with the techniques presented herein.

Figure 7:
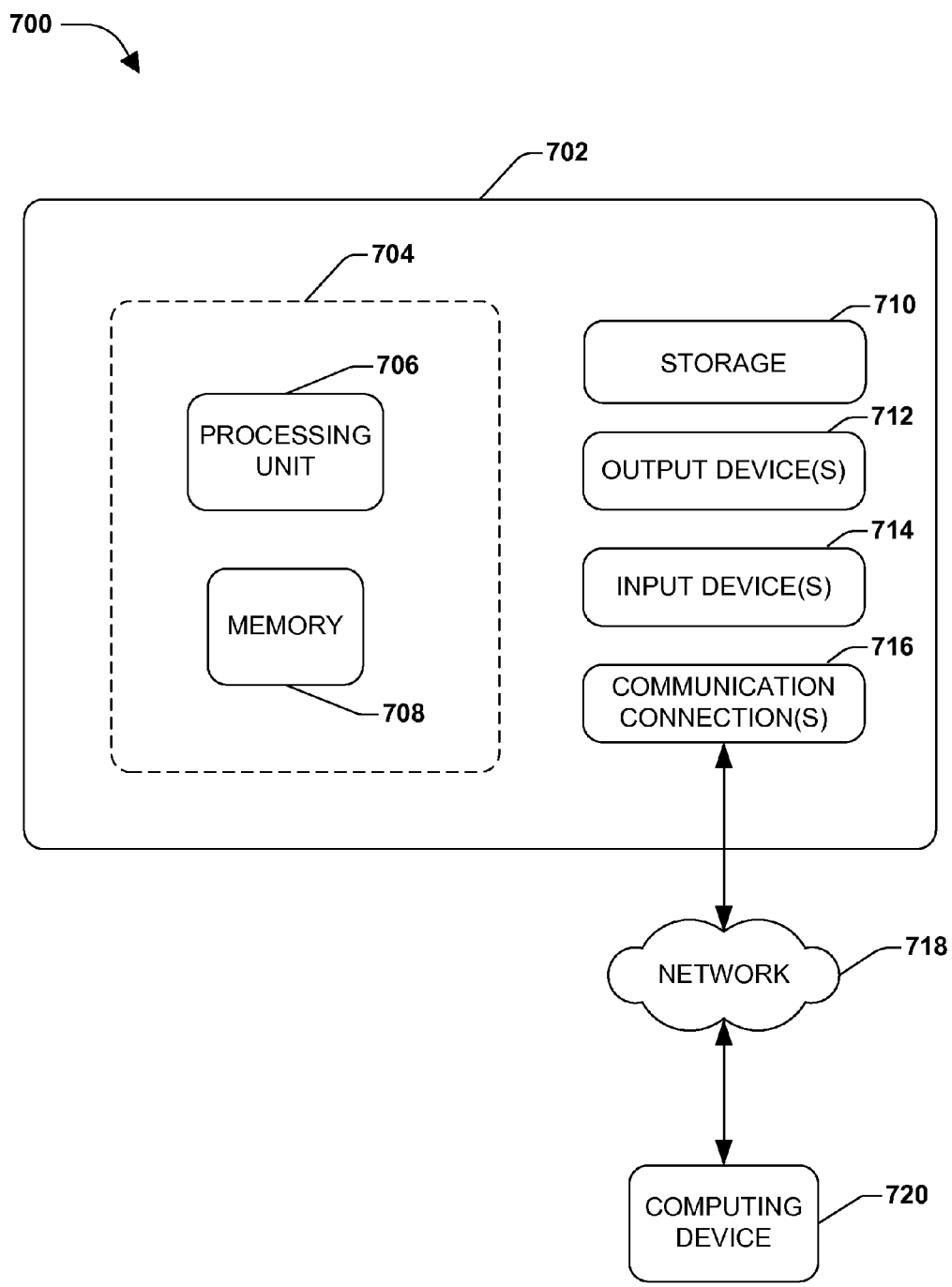
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 700 comprising a computing device 702 configured to implement one or more embodiments provided herein. In one configuration, computing device 702 includes at least one processing unit 706 and memory 708. Depending on the exact configuration and type of computing device, memory 708 may be volatile (such as RAM, for example), non-volatile (such as ROM, flash memory, etc., for example), or some combination of the two. This configuration is illustrated in FIG. 7 by dashed line 704.

In other embodiments, device 702 may include additional features and/or functionality. For example, device 702 may also include additional storage (e.g., removable and/or non-removable) including, but not limited to, magnetic storage, optical storage, and the like. Such additional storage is illustrated in FIG. 7 by storage 710. In an embodiment, computer readable instructions to implement one or more embodiments provided herein may be in storage 710. Storage 710 may also store other computer readable instructions to implement an operating system, an application program, and the like. Computer readable instructions may be loaded in memory 708 for execution by processing unit 706, for example.

The term "computer readable media" as used herein includes computer storage media. Computer storage media includes volatile and nonvolatile, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media may be part of device 702.

Device 702 may also include communication connection(s) 716 that allows device 702 to communicate with other devices. Communication connection(s) 716 may include, but is not limited to, a modem, a Network Interface Card (NIC), an integrated network interface, a radio frequency transmitter/receiver, an infrared port, a USB connection, or other interfaces for connecting computing device 702 to other computing devices. Communication connection(s) 716 may include a wired connection or a wireless connection. Communication connection(s) 716 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 702 may include input device(s) 714 such as keyboard, mouse, pen, voice input device, touch input device, infrared cameras, video input devices, and/or any other input device. Output device(s) 712 such as one or more displays, speakers, printers, and/or any other output device may also be included in device 702. Input device(s) 714 and output device(s) 712 may be connected to device 702 via a wired connection, wireless connection, or any combination thereof. In an embodiment, an input device or an output device from another computing device may be used as input device(s) 714 or output device(s) 712 for computing device 702.

Components of computing device 702 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 702 may be interconnected by a network. For example, memory 708 may be comprised of multiple physical memory units located in different physical locations interconnected by a network.

Those skilled in the art may realize that storage devices utilized to store computer readable instructions may be distributed across a network. For example, a computing device 720 accessible via a network 718 may store computer readable instructions to implement one or more embodiments provided herein. Computing device 702 may access computing device 720 and download a part or all of the computer readable instructions for execution. Alternatively, computing device 702 may download pieces of the computer readable instructions, as needed, or some instructions may be executed at computing device 702 and some at computing device 720.

Various operations of embodiments are provided herein. In an embodiment, one or more of the operations described may constitute computer readable instructions stored on one or more computer readable media, which if executed by a computing device, may cause the computing device to perform the operations described. The order in which some or all of the operations are described should not be construed as to imply that these operations are necessarily order dependent. Alternative ordering may be appreciated by one skilled in the art having the benefit of this description. Further, it may be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, and/or the same channel).

Although the disclosure has been shown and described with respect to one or more implementations, equivalent alterations and modifications may occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for routing a vehicle, comprising:
receiving information describing an event that is to occur at a venue, the information comprising a first attendance estimate associated with the event;
identifying one or more road segments where a degree of traffic congestion, above a specified threshold, is forecasted due to the event;
generating a route for a vehicle from a starting location to an ending location based upon the degree of traffic congestion of the one or more road segments;
displaying the route within a mapping field, of a road navigation user interface, depicting the one or more road segments;
displaying an avoidance zone interface, visually overlaying a depiction of the venue and the one or more road segments, within the mapping field, the avoidance zone interface having a first size and encompassing a first area of the mapping field based upon the first attendance estimate, the avoidance zone interface comprising a first avoidance subzone interface and a second avoidance subzone interface different than the first avoidance subzone interface, the first avoidance subzone interface corresponding to a first portion of the one or more road segments where a first degree of traffic congestion, above the specified threshold and above a second threshold, is forecasted due to the event, the second avoidance subzone interface corresponding to a second portion of the one or more road segments where a second degree of traffic congestion, above the specified threshold but below the second threshold, is forecasted due to the event;
responsive to receiving updated information, updating the degree of traffic congestion of the one or more road segments to identify an updated degree of traffic congestion for the one or more road segments, the updated information comprising a second attendance estimate associated with the event, the second attendance estimate different than the first attendance estimate; and
modifying a visual property of the avoidance zone interface, in real-time during display of the road navigation user interface to a user, based upon the updated degree of traffic congestion, the avoidance zone interface having a second size and encompassing a second area of the mapping field after the modifying based upon the second attendance estimate, the second size different than the first size and the second area different than the first area.

2. The method of claim 1, the modifying a visual property comprising:
responsive to the updated degree of traffic congestion not exceeding the specified threshold, modifying at least one of a size, a shape, or a position of the avoidance zone interface to not visually overlay the depiction of the one or more road segments.

3. The method of claim 1, the modifying a visual property comprising:
responsive to the updated information corresponding to a second degree of traffic congestion, above the specified threshold, for a second road segment, modifying at least one of a size, a shape, or a position of the avoidance zone interface to overlay the second road segment.

4. The method of claim 1, the displaying an avoidance zone interface comprising:
identifying a display position of the venue within the mapping field; and
defining a display position of the avoidance zone interface based upon the display position of the venue.

5. The method of claim 1, the updated information comprising an updated ticket sales number for the event.

6. The method of claim 1, the updated information comprising updated information regarding availability of parking within a spatial proximity of the venue.

7. The method of claim 1, the updated information comprising updated social network content regarding the event.

8. The method of claim 7, the updated social network content corresponding to at least one of a social network attendance list of a social network event regarding the event, a social network status message regarding the event, a number of social network status messages utilizing a hashtag corresponding to the event, or a number of users having liked the social network event.

9. The method of claim 1, the updated information comprising updated police officer assignment information for the venue.

10. The method of claim 1, the updated information comprising updated street permit closure information for the venue.

11. The method of claim 1, the displaying an avoidance zone interface comprising:
displaying the avoidance zone interface centered at the venue, depicted within the map field, and extending radially to include the one or more road segments.

12. The method of claim 1, the modifying a visual property comprising:
during display of the road navigation interface to the user through a user device, dynamically adjusting a position of the avoidance zone interface.

13. A system, comprising:
one or more processing units; and
memory comprising instructions which when executed by at least one of the one or more processing units perform a method comprising:
receiving information describing an event that is to occur at a venue;
identifying one or more road segments where a degree of traffic congestion, above a specified threshold, is forecasted due to the event;
generating a route for a vehicle from a starting location to an ending location based upon the degree of traffic congestion of the one or more road segments;
displaying the route within a mapping field, of a road navigation user interface, depicting the one or more road segments;
displaying an avoidance zone interface, visually overlaying a depiction of the venue and the one or more road segments, within the mapping field, the avoidance zone interface having a first size and encompassing a first area of the mapping field, the avoidance zone interface comprising a first avoidance subzone interface and a second avoidance subzone interface different than the first avoidance subzone interface, the first avoidance subzone interface corresponding to a first portion of the one or more road segments where a first degree of traffic congestion, above the specified threshold and above a second threshold, is forecasted due to the event, the second avoidance subzone interface corresponding to a second portion of the one or more road segments where a second degree of traffic congestion, above the specified threshold but below the second threshold, is forecasted due to the event;
responsive to receiving updated information, updating the degree of traffic congestion of the one or more road segments to identify an updated degree of traffic congestion for the one or more road segments; and
modifying a visual property of the avoidance zone interface, in real-time during display of the road navigation user interface to a user, based upon the updated degree of traffic congestion, the avoidance zone interface having a second size and encompassing a second area of the mapping field after the modifying, the second size different than the first size and the second area different than the first area.

14. The system of claim 13, the method comprising:
scraping a website associated with a news coverage data source to identify news content regarding the event; and
determining the degree of traffic congestion based upon the news content.

15. The system of claim 13, the method comprising:
scraping a website associated with a social network data source to identify social network content; and
determining the degree of traffic congestion based upon the social network content.

16. The system of claim 15, the social network content comprising at least one of a social network attendance list of a social network event regarding the event, a social network status message regarding the event, a number of social network status messages utilizing a hashtag corresponding to the event, or a number of users having liked the social network event.

17. The system of claim 13, the method comprising:
scraping a website associated with a parking establishment data source to identify a parking forecast; and
determining the degree of traffic congestion based upon the parking forecast.

18. The system of claim 13, the method comprising:
scraping a website associated with a government data source to identify at least one of street closure permit information or police officer assignment information; and
determining the degree of traffic congestion based upon at least one of the street closure permit information or the police officer assignment information.

19. The system of claim 13, the method comprising:
populating the mapping field with a ticket purchase interface used to facilitate purchase of tickets to the event at the venue.

20. A non-transitory computer readable medium comprising processor executable instructions that when executed via a processing unit perform a method, comprising:
receive information describing an event that is to occur at a venue, the information comprising a first attendance estimate associated with the event;
identifying a road segment where a degree of traffic congestion, above a specified threshold, is forecasted due to the event;
generating a route for a vehicle from a starting location to an ending location based upon the degree of traffic congestion of the road segment;
displaying the route within a mapping field, of a road navigation user interface, depicting the road segment;
displaying an avoidance zone interface, visually overlaying a depiction of the venue and the road segment, within the mapping field, the avoidance zone interface having a first size and encompassing a first area of the mapping field based upon the first attendance estimate;
responsive to receiving updated information, updating the degree of traffic congestion of the road segment to identify an updated degree of traffic congestion for the road segment, the updated information comprising a second attendance estimate associated with the event, the second attendance estimate different than the first attendance estimate; and
modifying a visual property of the avoidance zone interface, in real-time during display of the road navigation user interface to a user, based upon the updated traffic congestion, the avoidance zone interface having a second size and encompassing a second area of the mapping field after the modifying based upon the second attendance estimate, the second size different than the first size and the second area different than the first area.

* * * * *